(12) United States Patent
Chao et al.

(10) Patent No.: US 8,745,712 B2
(45) Date of Patent: Jun. 3, 2014

(54) DYNAMICALLY PROVIDING ALGORITHM-BASED PASSWORD/CHALLENGE AUTHENTICATION

(75) Inventors: Winson C W Chao, Taipei (TW); Ta-Wei Lin, Taipei (TW); Wei-Shiau Suen, Taipei (TW); Ming-Hsun Wu, Taipei (TW); Ying-Hung Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/598,538

(22) Filed: Aug. 29, 2012

(65) Prior Publication Data

US 2013/0055366 A1 Feb. 28, 2013

(30) Foreign Application Priority Data

Aug. 31, 2011 (TW) .............................. 100131432 A

(51) Int. Cl.
*G06F 21/00* (2013.01)
*H04L 29/06* (2006.01)
*G06F 21/31* (2013.01)
*H04L 9/32* (2006.01)

(52) U.S. Cl.
CPC ............ *H04L 63/0838* (2013.01); *H04L 63/08* (2013.01); *H04L 63/083* (2013.01); *G06F 21/31* (2013.01); *H04L 9/32* (2013.01); *H04L 9/3226* (2013.01); *H04L 9/3228* (2013.01); *H04L 9/3271* (2013.01)
USPC ........................................................... 726/6

(58) Field of Classification Search
None
See application file for complete search history.

(56) References Cited

U.S. PATENT DOCUMENTS 5,163,097 A * 11/1992 Pegg .............................. 713/183
5,841,871 A 11/1998 Pinkas
(Continued)

FOREIGN PATENT DOCUMENTS

JP 2007264839 7/2007
TW I268690 12/2006
(Continued)

OTHER PUBLICATIONS

Harris, J. Archer; "OPA: A One-Time Password System"; Proceedings of the International Conference on Parallel Processing Workshops (ICPPW'02), 2002.*

(Continued)

*Primary Examiner* — Andrew Nalven
*Assistant Examiner* — Christopher Ruprecht
(74) *Attorney, Agent, or Firm* — David W. Victor; Konrad, Raynes, Davda and Victor LLP

(57) ABSTRACT

Provided are a computer program product, method and system for dynamically providing algorithm-based password/challenge authentication. A page is generated including selectable conversion operators to enable generation of an algorithm that applies at least one selected conversion operator of the selectable conversion operators on a string to generate a password. A created algorithm created using the at least one selected conversion operator in the page is received. The created algorithm is associated with a username for use in authenticating access by a presenter of the username to a computer service.

15 Claims, 9 Drawing Sheets

(56) References Cited

U.S. PATENT DOCUMENTS

| | | | |
|---|---|---|---|
| 6,094,721 | A | 7/2000 | Eldridge et al. |
| 6,141,751 | A * | 10/2000 | Ogawa .......................... 713/170 |
| 7,409,705 | B2 | 8/2008 | Ueda et al. |
| 7,725,712 | B2 * | 5/2010 | Ginzburg et al. ............. 713/159 |
| 8,041,954 | B2 * | 10/2011 | Plesman ....................... 713/183 |
| 8,112,817 | B2 * | 2/2012 | Chiruvolu et al. ............. 726/30 |
| 2004/0049685 | A1 * | 3/2004 | Jaloveczki ..................... 713/182 |
| 2005/0114675 | A1 * | 5/2005 | Ginzburg ...................... 713/182 |
| 2007/0011724 | A1 | 1/2007 | Gonzalez et al. |
| 2007/0162745 | A1 * | 7/2007 | Ginzburg et al. ............. 713/159 |
| 2007/0226784 | A1 | 9/2007 | Ueda et al. |
| 2009/0037983 | A1 * | 2/2009 | Chiruvolu et al. ................. 726/4 |
| 2009/0158424 | A1 | 6/2009 | Yang |
| 2009/0259588 | A1 * | 10/2009 | Lindsay .......................... 705/40 |
| 2010/0083370 | A1 * | 4/2010 | Chen ............................... 726/19 |
| 2011/0191592 | A1 * | 8/2011 | Goertzen ...................... 713/182 |
| 2012/0005734 | A1 * | 1/2012 | Ogawa .............................. 726/6 |

FOREIGN PATENT DOCUMENTS

| | | |
|---|---|---|
| TW | 200837596 | 9/2008 |
| TW | 200910282 | 3/2009 |
| WO | 0217556 | 2/2002 |
| WO | 2006020096 | 2/2006 |

OTHER PUBLICATIONS

Isabel., D., "Port Knocking : Beyond the Basics", SANS Institute Info/sec Reading Room, dated Mar. 9, 2005, pp. 1-17.

Wenstorm et al., "Examining Cisco AAA Security Technology", dated Feb. 22, 2002, (online), (retrieved from the Internet on Jul. 16, 2012) at <URLhttp:www.ciscopress.com/articles/article.asp?p=25471&seqNum=3, pp. 1-13.

Patent Abstract for JP2007264839, published on Jul. 4, 2007, pp. 1-2.

Patent Abstract for TW1268690, published on Dec. 11, 2006, 1 pp.

Patent Abstract for TW200837596, published on Sep. 16, 2008, 1pp.

Patent Abstract for TW200910282, published on Mar. 1, 2009, 1 pp.

Entitled "Dynamically Providing Algorithm-Based Password/Challenge Authentication" invented by Winson CW Chao et al. pp. 1-35.

Office Action, dated Jun. 17, 2013, for U.S. Appl. No. 13/598,543, filed Aug. 29, 2012, entitled "Dynamically Providing Algorithm-Based Password/Challenge Authentication", invented by Winson CW Chao et al., pp. 1-41.

Response to Office Action, dated Sep. 17, 2013, for U.S. Appl. No. 13/598,543, filed Aug. 29, 2012, entitled "Dynamically Providing Algorithm-Based Password/Challenge Authentication", invented by Winson CW Chao et al., pp. 1-11.

Notice of Allowance, dated Jan. 7, 2012, for U.S. Appl. No. 13/598,543, filed Aug. 29, 2012, entitled, "Dynamically Providing Algorithm-Based Password/Challenge Authentication", invented by Winson CW Chao et al., pp. 1-27.

* cited by examiner

DYNAMICALLY PROVIDING ALGORITHM-BASED PASSWORD/CHALLENGE AUTHENTICATION

CROSS-REFERENCE TO RELATED FOREIGN APPLICATION

This application is a non-provisional application that claims priority benefits under Title 35, United States Code, Section 119(a)-(d) from Taiwanese Patent Application entitled "METHOD AND COMPUTER SYSTEM FOR DYNAMICALLY PROVIDING ALGORITHM-BASED PASSWORD/CHALLENGE AUTHENTICATION", by Winson C W CHAO, Wei-Shiau SUEN, Ming-Hsun WU, Ying-Hung YU, and Ta-Wei LIN, having Taiwan Patent Application Serial No. 100131432, filed on Aug. 31, 2011, which Taiwanese Patent Application is incorporated herein by reference in its entirety.

BACKGROUND OF THE INVENTION

1. Field of the Invention

The present invention relates to a computer program product, method and system for dynamically providing algorithm-based password/challenge authentication.

2. Description of the Related Art

Daily life requires the use of a wide variety of information devices, such as mobile phones, personal computers, notebook computers, and tablet computers. The information devices may keep users' personal data and identity data. Due to the prevalence of networks, an increasing number of network functions are performed on-line. In particular, servers have to store users' personal data and identity data in order to provide network services, such as social networking services, webpage/email services, mobile commerce services, banking on-line transaction services, database access services, or content and information provider services. Hence, to ensure security and privacy, the servers usually require that, before accessing the services provided by the servers, users have to follow an authentication procedure for recognizing the users' identity. At present, the commonest authentication procedure is a password-based challenge authentication procedure whereby a server typically requires that, before accessing its services, users ought to enter a username and a password for identity recognition (or known as "login"), in order to prevent user personal data from being stolen or fraudulently changed.

With network coverage and accessibility increasing rapidly, hackers are becoming more likely to target a user's password with a view to faking the user's identity. Therefore, simple passwords no longer provide adequate protection. For this reason, various mechanisms are put forth to provide better protection. For example, users are required to create a password that meets the requirements of password length, complexity, and unpredictability, such that the strength of the password is sufficient to fend off brute-force search attacks and dictionary attacks. Furthermore, users are required to change their passwords regularly to invalidate old passwords, thereby reducing the chance that their passwords will be cracked. The aforesaid mechanisms enhance security and thus help users protect their accounts.

However, referring to FIG. 1, a client end 100 requests access to different web services and an authentication procedure of a username/password 102 provided by website A 110, website B 120, and website C 130 through a network 140 by means of a challenge 101. In practices, most users usually use different usernames/passwords to log in website A 110, website B 120, and website C 130, respectively. The mechanisms require users to memorize passwords for accessing the web services of different websites, respectively. Furthermore, users usually log in a small number of websites on a daily basis, and thus are unlikely to memorize accurately the passwords of those websites which are seldom visited by them. Because of this, they have to guess the rarely-used passwords, not to mention that their accounts would be locked out after incorrect password entries.

Therefore, there is a need in the art to assist users in memorizing troublesome passwords while ensuring security. A solution lies in conventional one-time password (OTP) technology. However, OTP technology can provide passwords to users only when additional technology is accessible. In most circumstances, OTP technology requires an electronic device. Chances are the electronic device will get lost, and thus present the risk of losing the passwords. Furthermore, it is unlikely for an organization to share its OTP generation mechanism with another organization. Thus, to access web services provided by different websites, a user has to use different electronic devices. Therefore, users have to carry multiple portable electronic devices, thereby adding to a risk of loss.

Another solution is provided by a password hint mechanism. However, the mechanism works at the cost of undermining password security, because unauthorized persons can also see the password hint and therefore help a hacker crack the password.

Furthermore, the mechanism is not effective in giving an appropriate password hint to a complicated password. Therefore, sensitive systems nowadays seldom use the mechanism.

There are numerous conventional methods of password-based challenges for providing better protection. Examples are Patent Cooperation Treaty (PCT) Publications WO 2006/020096 and, WO 2002/017556, U.S. Pat. Nos. 5,841,871 and 6,094,721, and U.S. Patent Pub. No. 2007/0011724.

SUMMARY

Provided are a computer program product, method and system for dynamically providing algorithm-based password/challenge authentication. A page is generated including selectable conversion operators to enable generation of an algorithm that applies at least one selected conversion operator of the selectable conversion operators on a string to generate a password. A created algorithm created using the at least one selected conversion operator in the page is received. The created algorithm is associated with a username for use in authenticating access by a presenter of the username to a computer service.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
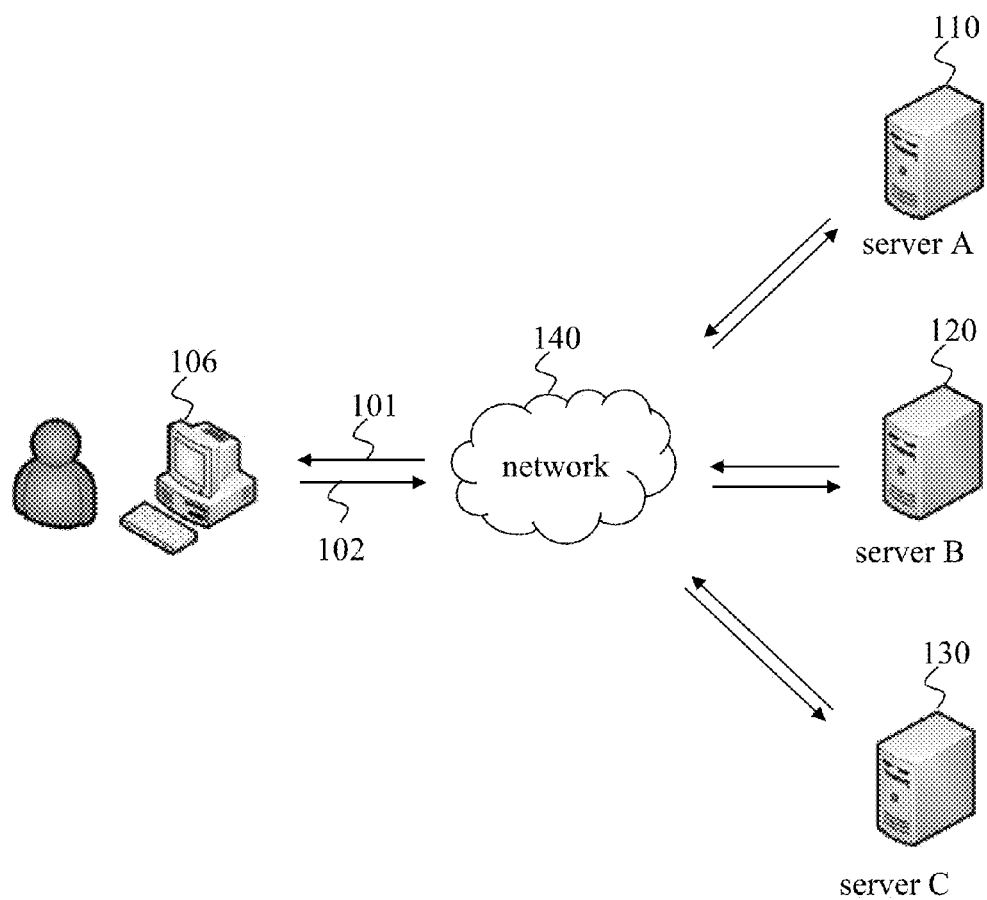
FIG. 1 is a schematic view of a conventional system of password/challenge authentication as known in the prior art.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The described embodiments provide a novel password-based challenge mechanism for recognizing a user identity. The mechanism requires users to memorize a single algorithm instead of multiple passwords for accessing the web services of different websites. The algorithm is stored in a server that provides authentication of a user's authority to access a web service. After a user has logged in a webpage, the server gives the user a randomly generated seed string (comprising a character, a symbol, and a number) that functions as a prompt. Then, the user enters a first string converted from the seed string with the user-memorized algorithm and treated as a password. Afterward, the server compares a correct password (a second string) converted from the seed string with the stored algorithm with the password (i.e. the first string) entered by the user. A close match indicates that the login is successful.

One embodiment provides a method for dynamically providing algorithm-based password/challenge authentication in a server, the comprising:
(a) sending a login webpage in response to a login request to access a web service from a client computer, the login webpage comprising a field for displaying a seed string generated randomly and a username entry field;
(b) sending the seed string generated randomly and displayed in the seed string display field in response to a username from the client computer; and
(c) comparing a first string with a second string which is converted from the seed string with an algorithm stored in a server in advance and associated with the username in response to the first string converted from the seed string with the algorithm and treated as a password and the username from the client computer.

Another embodiment provides a method for dynamically providing algorithm-based password/challenge authentication in a server, comprising:
(a) sending a login webpage in response to a login request to access a web service from a client computer, the login webpage comprising a seed string generated randomly and a username entry field; and
(b) comparing a first string with a second string which is converted from the seed string with an algorithm stored in the server in advance and associated with the username in response to the first string converted from the seed string with the algorithm and treated as a password and the username from the client computer.

A yet further embodiments provides a method for dynamically providing algorithm-based password/challenge authentication in a computer system, comprising:
(a) sending a login window in response to a login request from a user, the login window comprising a display field displaying a seed string generated randomly and a username entry field;
(b) sending a seed string generated randomly and displayed in the seed string display field in response to a username entered by the user; and
(c) comparing a first string with a second string which is converted from the seed string with an algorithm stored in the server in advance and associated with the username in response to the first string converted from the seed string with the algorithm and treated as a password and the username from the user.

A further embodiment provides a method for dynamically providing algorithm-based password/challenge authentication in a computer system, comprising:
(a) sending a login window in response to a login request from a user, the login window comprising a seed string generated randomly and a username entry field; and
(b) comparing a first string with a second string which is converted from the seed string with an algorithm stored in a server in advance and associated with the username in response to the first string converted from the seed string with the algorithm and treated as a password and the username from the user.

A still further embodiment provides a method of registering an algorithm for password-based challenge in a server, comprising:
(a) sending a registration webpage in response to a request to access a web service from a client computer, the registration webpage comprising a plurality of conversion operators, a plurality of operands, and a logical operator which are required for creating an algorithm;
(b) sending a verification webpage in response to an algorithm and a username from the client computer, the verification webpage comprising a seed string generated randomly, provided to the client computer, and treated as a prompt for verifying the algorithm;
(c) comparing by the server a first string with a second string which is converted from the seed string with the algorithm so as to verify the algorithm in response to the first string converted from the seed string with the algorithm and treated as a password from the client computer; and
(d) storing the username and the algorithm in response to the verification.

A further embodiment provides a method of registering an algorithm for password-based challenge in a computer system, comprising:
(a) sending a login window in response to a request to access a web service from a user, the login window comprising a plurality of conversion operators, a plurality of operands, and a logical operator which are required for creating an algorithm;

(b) sending a verification window in response to an algorithm and a username entered by the user, the verification window comprising a seed string generated randomly, provided to the client computer, and treated as a prompt for verifying the algorithm;

(c) comparing by the computer system a first string with a second string which is converted from the seed string with the algorithm so as to verify the algorithm in response to the first string converted from the seed string with the algorithm, treated as a password, and entered by the user; and (d) storing the username and the algorithm in response to the verification.

The following description, the appended claims, and the embodiments of the present invention further illustrate the features and advantages of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 2 through FIG. 7B, computer devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer System

Figure 2:
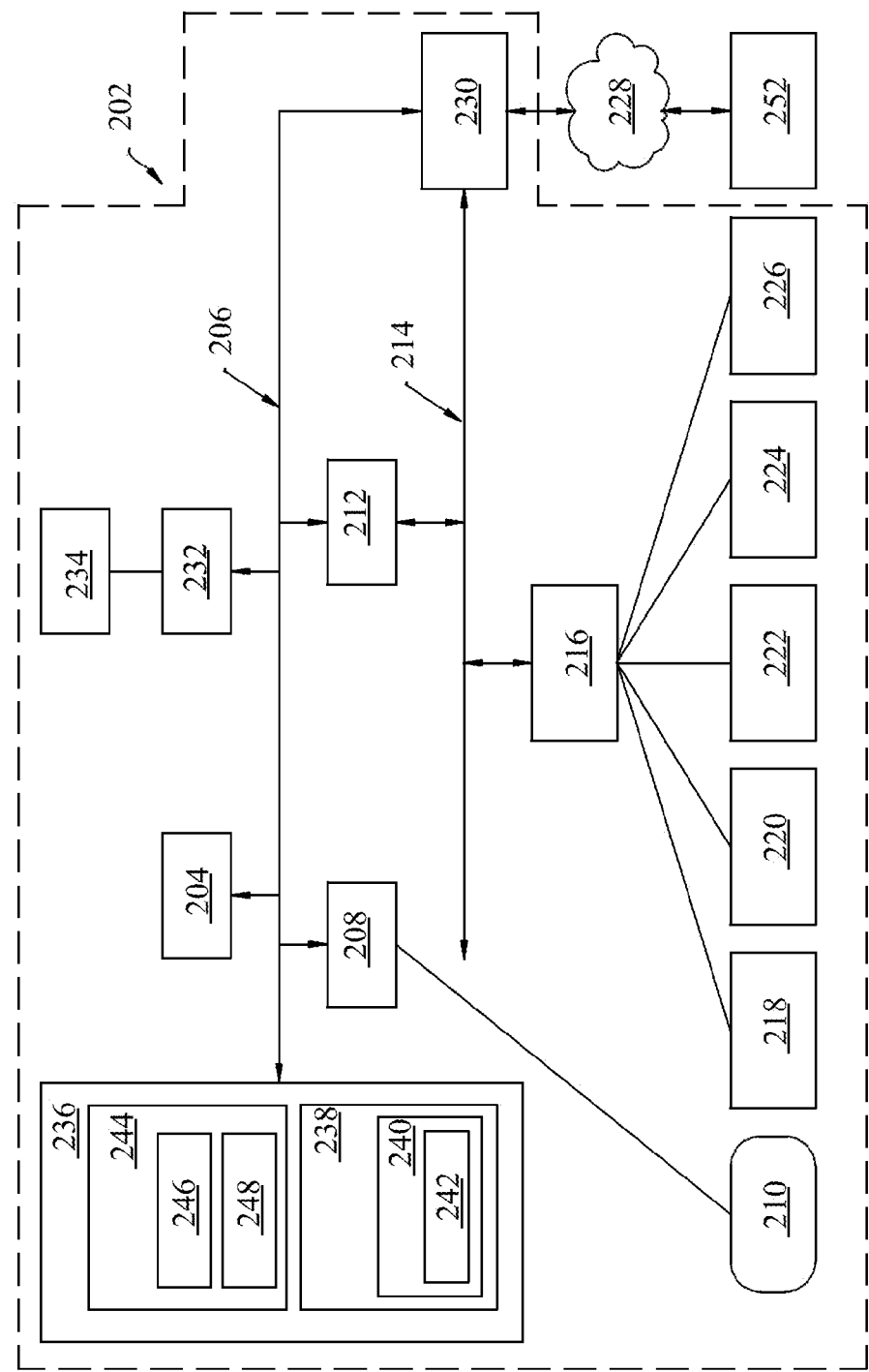
FIG. 2 is an embodiment of a hardware environment of a service-provider server.

FIG. 2 is a block diagram of an illustrative embodiment of hardware environment of a service-provider server 202. In an exemplary embodiment, a server is a universal desktop computer comprising: a processor for executing various applications; a storage device for storing various information and program code; a display device, a communication device, an input/output device which function as interfaces for communicating with a user; and a peripheral component or other components serving a specific purpose. In another embodiment, the present invention is implemented in another way and thus having less or more other devices or components. The network can also be implemented in any form of a connection, including a fixed connection, such as a local area network (LAN) or a wide area network (WAN), or getting connected to the Internet through a dial-up connection provided by an Internet service provider (ISP). The network connection is not restricted to cable connection and wireless connection; instead, it can also be implemented by wireless connection in the form of a GSM connection or a Wi-Fi connection for communicating with a client computer. The network further comprises other hardware and software components (not shown), such as an additional computer system, router, and firewall.

As shown in FIG. 2, a server 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

The server 202 is able to communicate with a service provider server 252 via a network 228 using a network interface 230, which is coupled to system bus 206. Network 228 may be an external network such as the Internet, or an internal network such as an Ethernet or a Virtual Private Network (VPN). Using network 228, the server 202 is able to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes client computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, embodiments will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

The hardware framework of a client computer 252 is identical or similar to that of the server 202, or is any conventional basic framework, and the present invention is not limited thereto. For example, the client computer 252 is a desktop computer, a notebook computer, a personal digital assistant (PDA), or a smartphone. However, FIG. 2 and the above examples are not restrictive of the embodiments. The client computer 252 comprises a browser. The browser comprises a program module and instructions. The program module and commands comply with the Hypertext Transfer Protocol (HTTP) whereby a World Wide Web (WWW) client (i.e., the client computer 252) sends and receives web-based messages through the Internet, thereby effectuating communication with the server 202.

An application 244 comprises a password-based challenge module 246 of the present invention. The password-based challenge module 246 comprises a program module and commands. The program module and commands can communicate with the client computer 252, so as to recognize a user's identity. The password-based challenge module 246 is a module in the application, or is implemented in the form of a daemon. In another embodiment, the password-based challenge module 246 is implemented as a program in another form. The password-based challenge module 246 comprises a code for executing the procedures described below and depicted with FIG. 4A and FIG. 4B.

The hardware elements depicted in the server 202 are not intended to be exhaustive, but rather are representative to highlight essential components required by the present invention. For instance, client computer 202 may include alternate memory storage devices such as magnetic cassettes, Digital Versatile Disks (DVDs), Bernoulli cartridges, and the like. These and other variations are intended to be within the spirit and scope of the present invention.

Password/Challenge Authentication Process Flow

Figure 3:
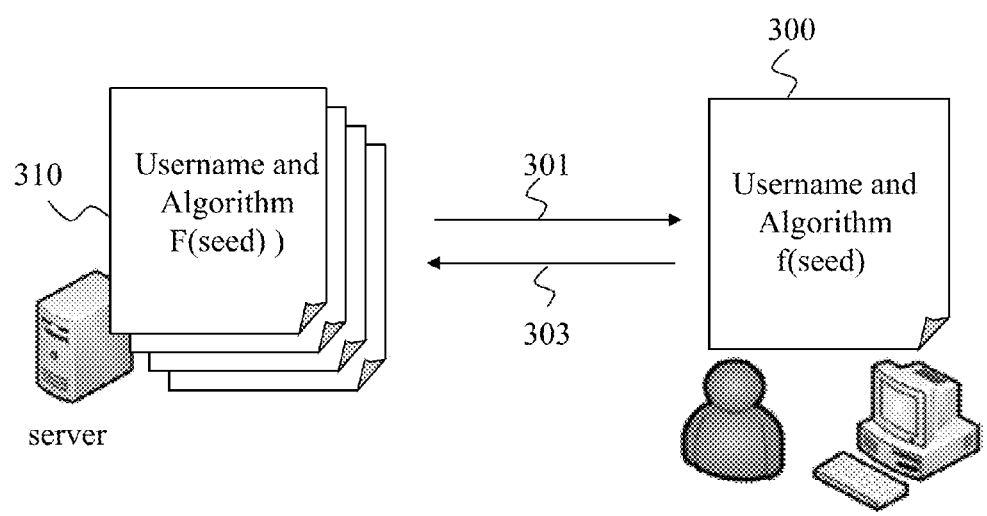
FIG. 3 is an embodiment of a system of password/challenge authentication.
Figure 4A:
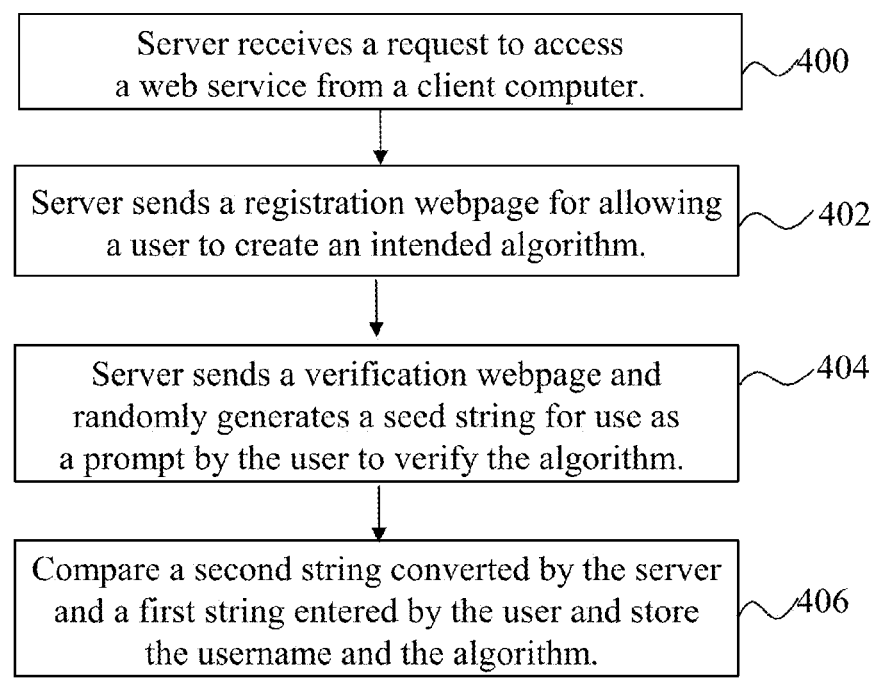
FIG. 4A and FIG. 4B are embodiments of flow charts of a method of registration and login of password/challenge authentication.
Figure 4B:
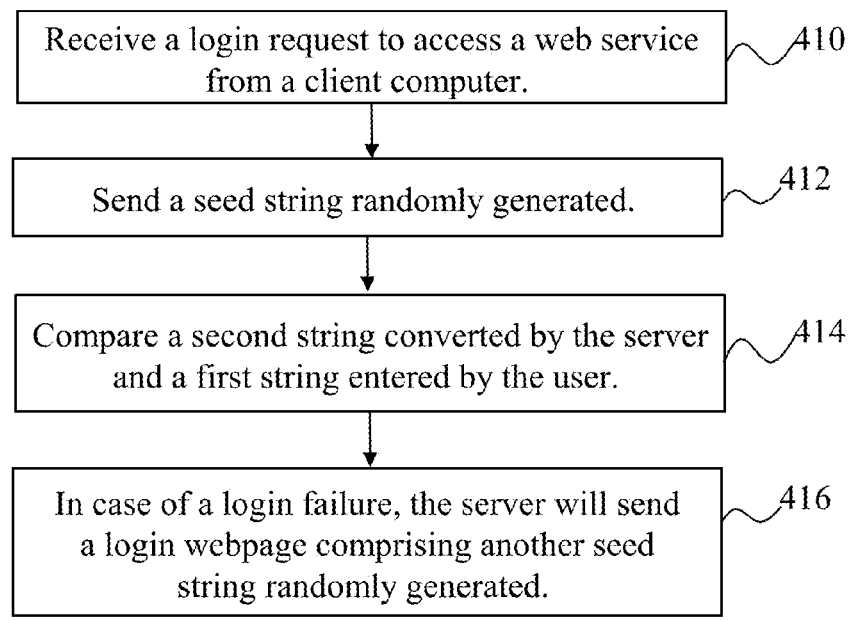
Figure 5:
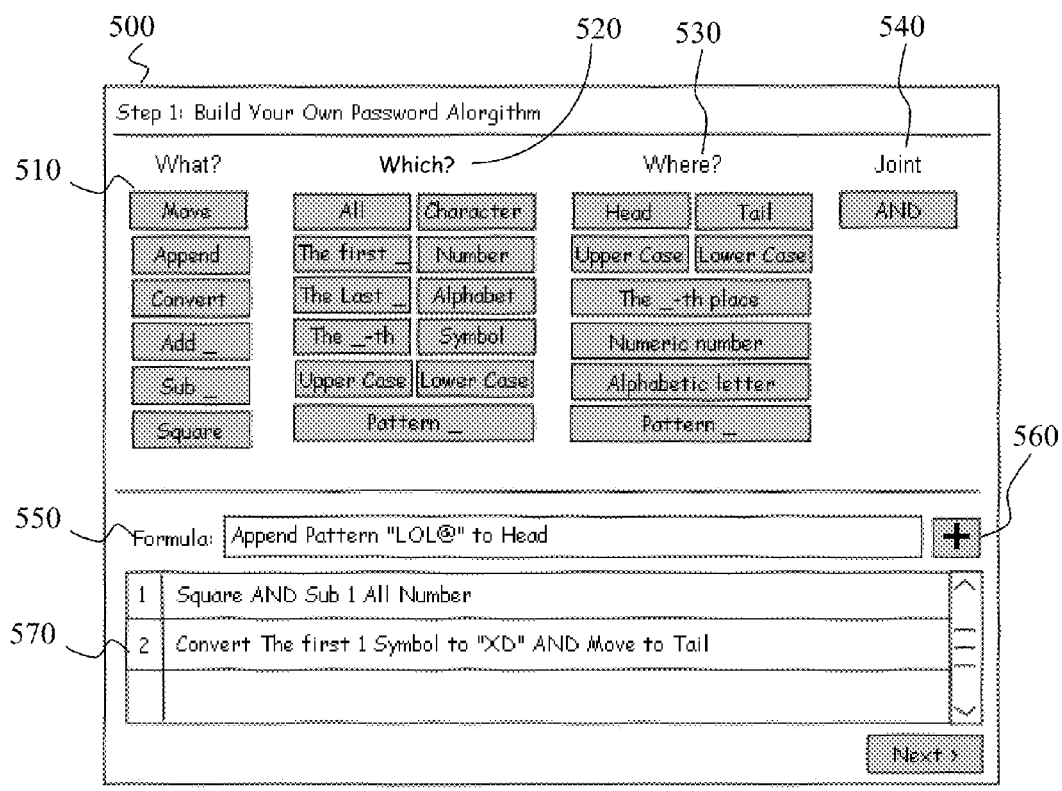
FIG. 5 is an embodiment of an execution frame of registration.
Figure 6:
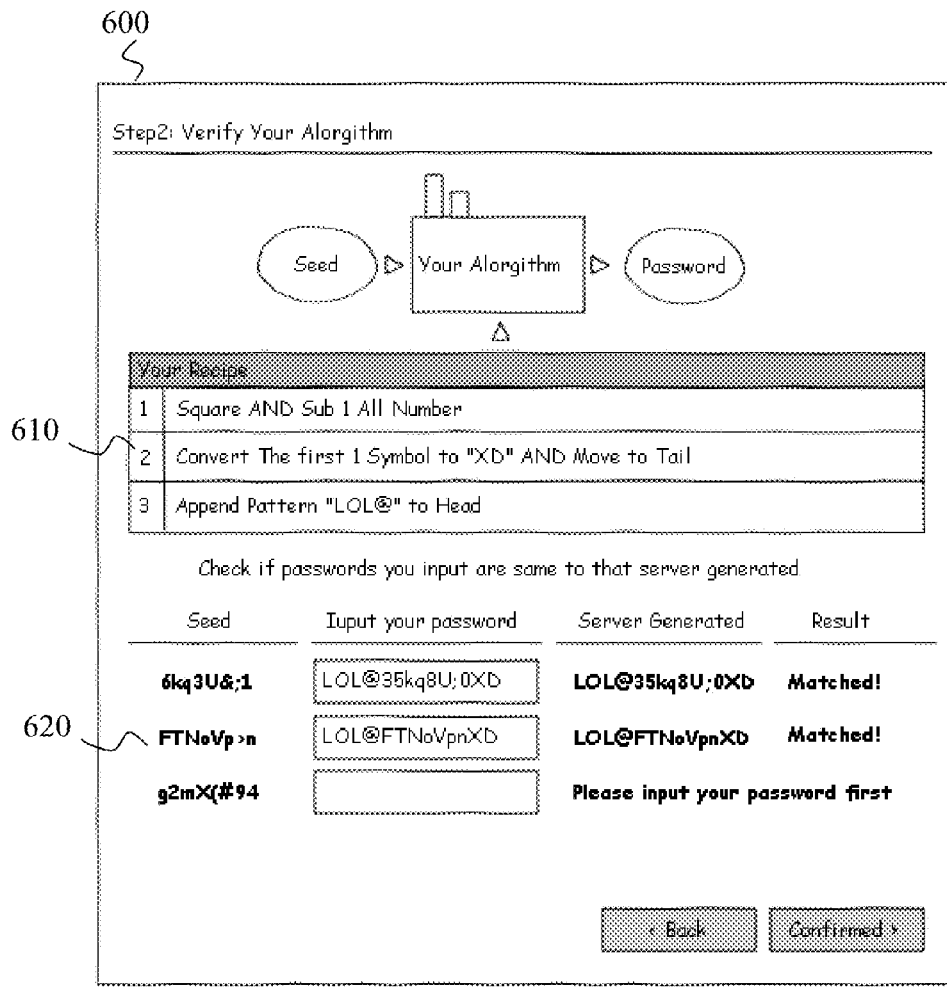
FIG. 6 is an embodiment of an execution frame of verification.

FIG. 4A and FIG. 4B are flow charts of a method illustrated with FIG. 3 and performed at the server 202 with a password-based challenge module. FIG. 5 and FIG. 6 show execution frames of registration and verification prompted by a server and can be read in conjunction with FIG. 4A.

FIG. 4A is a flow chart of a method of registration of password/challenge authentication according to a specific embodiment.

Step 400: the server 202 end receives a request to access a web service from the client computer 252.

Step 402: the server 202 sends a registration webpage 500 in response to the request (as shown in FIG. 5). A user of the client computer 252 enters a username and creates an intended algorithm on the registration webpage 500.

Step 404: the server 202 sends a verification webpage 600 in response to the algorithm created by the user of the client computer 252 (as shown in FIG. 6) and provides a randomly generated seed string to the user of the client computer 252 as a prompt for verifying the algorithm. Then, the user enters a first string converted from the seed string with the user-memorized algorithm and treated as a password.

Step 406: the server 202 compares a second string converted from the seed string with the algorithm entered by the user with the first string entered by the user. A close match indicates a successful verification. The server 202 stores the username and the algorithm in response to the successful verification.

Referring to FIG. 5, the registration webpage 500 comprises a conversion operator 510, an operand Which 520, an operand Where 530, and a logical operator AND 540 which are required for an algorithm. The conversion operator 510 comprises Move, Append, Convert, Add_, Sub_ and Square, but the described embodiments are not limited to these operators.

The operand Which 520 indicates which portion of a seed string has to be converted by the conversion operator, such as the whole string (All), only characters (Character), only numbers (Number), only alphabets (Alphabet), only upper case (Upper Case), only lower case (Lower Case), the "_" string (The "_" th), the first "_" symbol (The first"_" symbol), the last"_" symbol (The last"_" symbol), and a fixed string (or "Pattern_" for short) where "_" denotes a numeric number, but the present invention is not limited thereto.

The operand Where 530 indicates the destination of conversion or the manner of conversion pertaining to the seed string portion to be converted by the conversion operator, such as head, tail, converted to upper case, converted to lower case, converted to a numeric number, converted to an alphabet letter, converted to the "_" place (The "_" th place), and converted to "Pattern_", but the present invention is not limited thereto.

According to a specific embodiment, the webpage (not shown) to which a user enters a username is different from the registration webpage for use with an intended algorithm to be created by the user. In another embodiment, the webpage to which a username is entered can be the same as the registration webpage.

As mentioned earlier, the user of the client computer 252 enters a username, applies the conversion operator 510, the operand Which 520, the operand Where 530, and the logical operator AND 540 to the registration webpage 500, and creates an intended algorithm 550. Furthermore, with an addition symbol 560, the user creates an algorithm comprising a plurality of equations. After the user has created the intended algorithm, the user can enter a verification webpage 600 for performing the verification of the algorithm.

Referring to FIG. 6, the verification webpage 600 comprises an algorithm 610 created by the user and comprising a plurality of equations and a verification box 620, but the described embodiments are not limited thereto. The verification box 620 comprises a seed string box, a password entry box, a second string display box converted by the server 202 from the seed string with the algorithm entered by the user, and a comparison result box. For example, the server 202 generates a first string "6kq3U&;1" randomly, and converts it into a second string "LOL@35kq8U;0XD" with the algorithm 610 entered by the user. That is to say, the verification process comprises the steps of: subtracting one from the square of each of the numeric numbers in the seed string according to the first equation of the algorithm 610; converting the first symbol ("&" in this embodiment) in the seed string into "XD" with the second equation of the algorithm 610 and moving "XD" to the tail of the seed string; and moving "LOL@" to the head of the seed string with the second equation.

The seed string box contains seed strings generated randomly by three said servers 202 for the user to verify the algorithm. The present invention is not restrictive of the quantity of the seed strings contained in the seed string box. The seed strings of the present invention are generated randomly by any conventional technology; for further details, please read the webpage http://www.random.org/strings/ for a random string generator described therein. The described embodiments provide a string as a seed, and thus is also applicable to any environment where a user logs in a server by means of a terminal. The present invention further provides a conventional "CAPTCHA" image as a seed for use by the user. For further details of the "CAPTCHA" image, please make reference to related conventional "CAPTCHA" image production technology.

FIG. 4B is a flow chart of a method of login of password/challenge authentication according to a specific embodiment of the present invention. FIG. 4B is a flow chart of the method illustrated with FIG. 3 and performed at the server 202. FIG. 3 is a schematic view of a system of password/challenge authentication according to a specific embodiment.

Figure 7A:
FIG. 7A and FIG. 7B are embodiments of execution frames of login.

Step 410: a server 310 sends a login webpage 700 in response to a login request to access a web service from a client computer 300 (as shown in FIG. 7A). The login webpage 700 comprises a seed string display field 710, a username entry field 720, and a password entry field 730 which are generated randomly by the server 310.

Step 412: the server 310 sends a seed string 301 generated randomly and displayed in the seed string display field 710 in response to a username entered by a user. Alternatively, the server 310 sends a login webpage comprising the randomly generated seed string and username entry field in response to a login request to access a web service from a client computer.

Step 414: in response to a username and a first string 303 (i.e., f(seed)) treated as a password which is converted from the seed string with the user-memorized algorithm and entered by the user, the server 310 compares a correct password (i.e., the second character string, or known as F(seed)), converted from the seed string with the stored algorithm associated with the username, with the password (i.e., the first character string, or known as f(seed)) entered by the user. A close match (that is, f(seed)=F(seed)) indicates that the login is successful.

Figure 7B:
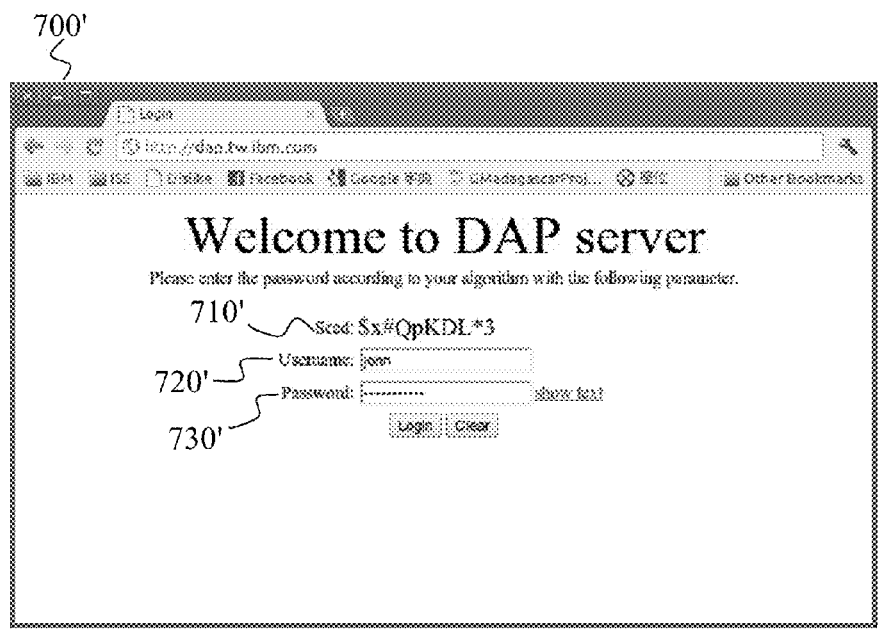

Step 416: in case of a login failure, the server 310 will send a login webpage 700' (as shown in FIG. 7B). Repeat step 412 and step 414.

In the described embodiment, what is shared by and between a user and a server is an algorithm created by the user rather than any password which has to be changed regularly. In described embodiments, a password transmitted by a network is created by an algorithm and thus is a one-time password that is valid for only one login session. Therefore, even if the password is exposed, no hacker can continue to use it. Thus, described embodiments dispense with the regular changing of a password. Furthermore, the user can apply the algorithm to all websites and thus no longer needs to memorize numerous passwords for logging into different websites to access web services. Therefore, described embodiments have the advantages of a conventional OTP but dispense with the need for an electronic device, which is disadvantageous.

Furthermore, described embodiments are also applicable to a wide variety of information devices which are not Web-based, such as mobile phones, personal computers, notebook computers, and tablet computers. The information devices keep users' personal data and identity data, and thus can also provide single-machine application by means of a password-based challenge module of the described embodiments. The password-based challenge module 246 can be a module in an application. However, in another embodiment, the password-based challenge module 246 can also be implemented as a program in another form, for example, being integrated into an operating system level and adapted to challenge a user when starting the operating system.

The foregoing described embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A computer program product comprising a computer readable storage device having code executed to perform operations for registering an algorithm for use in password-based challenge authentication and accessing a memory, the operations comprising:
generating a page to enable creation of an algorithm for generating a password, wherein the page includes:
selectable conversion operators to be applied to selected portions of a seed string,
wherein the selectable conversion operators include at least one of move, append, convert, add, subtract, and square,
wherein the seed string comprises a randomly generated string of characters including at least one of numbers, alphabets, and symbols;
selectable portions of the seed string, comprising less than all of the seed string, to which selected conversion operators are to be applied,
wherein the selectable portions of the seed string include at least one of first, last, and nth of characters, numbers, alphabets, symbols, upper case, or lower case in the seed string; and
fields to display the algorithm during creation, wherein the algorithm specifies at least one selected conversion operator, selected from the selectable conversion operators, to convert at least one selected portion of the seed string, selected from the selectable portions of the seed string, to generate a password including the converted portion of the seed string;
receiving a created algorithm created using the at least one selected conversion operator and the at least one selected portion of the seed string in the page; and
associating the created algorithm with a username in the memory for use in authenticating access by a presenter of the username to a computer service.

2. The computer program product of claim 1, wherein the at least one selected conversion operator and the at least one selected portion of the seed string are selected by one of a user at a client computer receiving the page from a server including the computer program product or a user at a computer including the computer program product.

3. The computer program product of claim 1, wherein the page further includes selectable destinations of the seed string to which selected portions of the seed string to which selected conversion operators are applied are to be moved, wherein the selectable destinations include at least one of head, tail, and nth place; and
wherein the created algorithm further specifies at least one selected destination of the seed string, selected from the selectable destinations of the seed string, to which the at least one selected portion of the seed string to which the at least one selected conversion operator is applied is moved to generate the password.

4. The computer program product of claim 1, wherein the page comprises a first page, wherein the operations further comprise:
generating a second page including information on the created algorithm and fields to enable confirmation of an operation of the algorithm; and
receiving confirmation of the created algorithm through the second page, wherein the created algorithm is associated with the username in response to receiving confirmation through the second page.

5. The computer program product of claim 4, wherein the fields to enable the confirmation of the operation of the algorithm include a seed string, a field for entry of an entered password, a generated password resulting from applying the created algorithm to the seed string, and information indicating whether the entered password matches the generated password.

6. A system, comprising:
a processor; and
a computer readable storage device having code executed by the processor to perform operations for registering an algorithm for use in password-based challenge authentication, the operations comprising:
generating a page to enable creation of an algorithm for generating a password, wherein the page includes:
selectable conversion operators to be applied to selected portions of a seed string,
wherein the selectable conversion operators include at least one of move, append, convert, add, subtract, and square,
wherein the seed string comprises a randomly generated string of characters including at least one of numbers, alphabets, and symbols;
selectable portions of the seed string, comprising less than all of the seed string, to which selected conversion operators are to be applied,
wherein the selectable portions of the seed string include at least one of first, last, and nth of characters, numbers, alphabets, symbols, upper case, or lower case in the seed string; and
fields to display the algorithm during creation, wherein the algorithm specifies at least one selected conversion operator, selected from the selectable conversion operators, to convert at least one selected portion of the seed string, selected from the selectable portions of the seed string, to generate a password including the converted portion of the seed string;
receiving a created algorithm created using the at least one selected conversion operator and the at least one selected portion of the seed string in the page; and
associating the created algorithm with a username in the computer readable storage device for use in authenticating access by a presenter of the username to a computer service.

7. The system of claim 6, wherein the at least one selected conversion operator and the at least one selected portion of the seed string are selected by one of a user at a computer in communication with the system over a network or a user operating the system.

8. The system of claim 6, wherein the page further includes selectable destinations of the seed string to which selected portions of the seed string to which selected conversion operators are applied are to be moved, wherein the selectable destinations include at least one of head, tail, and nth place;
wherein the created algorithm further specifies at least one selected destination of the seed string, selected from the selectable destinations of the seed string, to which the at least one selected portion of the seed string to which the at least one selected conversion operator is applied is moved to generate the password.

9. The system of claim 6, wherein the page comprises a first page, wherein the operations further comprise:
generating a second page including information on the created algorithm and fields to enable confirmation of an operation of the algorithm; and
receiving confirmation of the created algorithm through the second page, wherein the created algorithm is associated with the username in response to receiving confirmation through the second page.

10. The system of claim 9, wherein the fields to enable the confirmation of the operation of the algorithm include a seed string, a field for entry of an entered password, a generated password resulting from applying the created algorithm to the seed string, and information indicating whether the entered password matches the generated password.

11. A method implemented in a computer system for registering an algorithm for use in password-based challenge authentication, comprising:
generating a page to enable creation of an algorithm for generating a password, wherein the page includes:
selectable conversion operators to be applied to selected portions of a seed string,
wherein the selectable conversion operators include at least one of move, append, convert, add, subtract, and square,
wherein the seed string comprises a randomly generated string of characters including at least one of numbers, alphabets, and symbols;
selectable portions of the seed string, comprising less than all of the seed string, to which selected conversion operators are to be applied,
wherein the selectable portions of the seed string include at least one of first, last, and nth of characters, numbers, alphabets, symbols, upper case, or lower case in the seed string; and
fields to display the algorithm during creation, wherein the algorithm specifies at least one selected conversion operator, selected from the selectable conversion operators, to convert at least one selected portion of the seed string, selected from the selectable portions of the seed string, to generate a password including the converted portion of the seed string;
receiving a created algorithm created using the at least one selected conversion operator and the at least one selected portion of the seed string in the page; and
associating the created algorithm with a username in a memory for use in authenticating access by a presenter of the username to a computer service.

12. The method of claim 11, wherein the at least one selected conversion operator and the at least one selected portion of the seed string are selected by one of a user at a client computer receiving the page from a server that generates the page, receives the created algorithm, and associates the created algorithm or a user at a computer including a computer program that generated the page, received the created algorithm, and associated the created algorithm.

13. The method of claim 11, wherein the page further includes selectable destinations of the seed string to which selected portions of the seed string to which selected conversion operators are applied are to be moved, wherein the selectable destinations include at least one of head, tail, and nth place;
wherein the created algorithm further applies at least one selected destination of the seed string to which the at least one selected portion of the seed string to which the at least one selected conversion operator is applied is moved to generate the password.

14. The method of claim 11, wherein the page comprises a first page, further comprising:
generating a second page including information on the created algorithm and fields to enable confirmation of an operation of the algorithm; and
receiving confirmation of the created algorithm through the second page, wherein the created algorithm is associated with the username in response to receiving confirmation through the second page.

15. The method of claim 14, wherein the fields to enable the confirmation of the operation of the algorithm include a seed string, a field for entry of an entered password, a generated password resulting from applying the created algorithm to the seed string, and information indicating whether the entered password matches the generated password.

* * * * *